Figure 1:
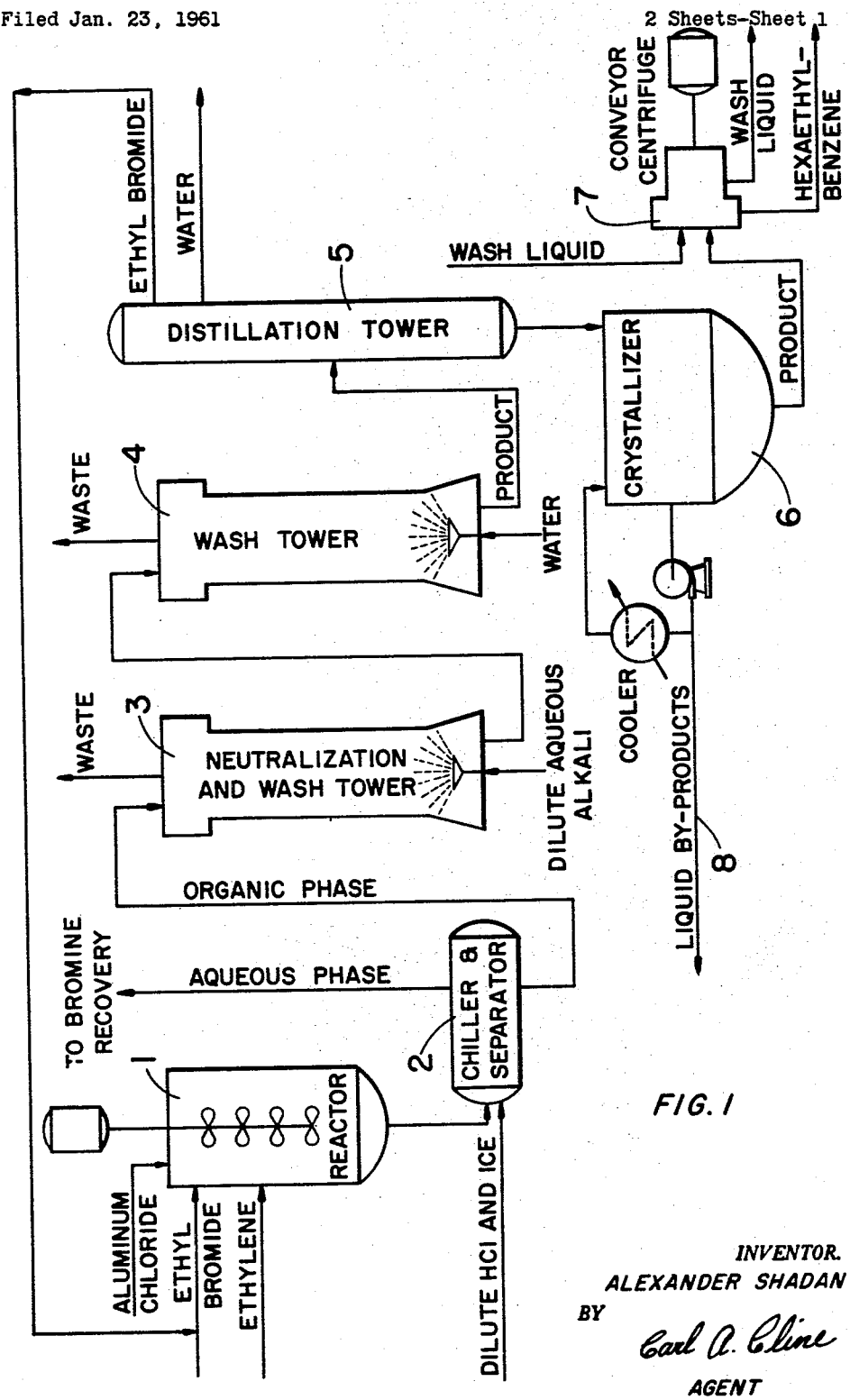

INVENTOR.
ALEXANDER SHADAN

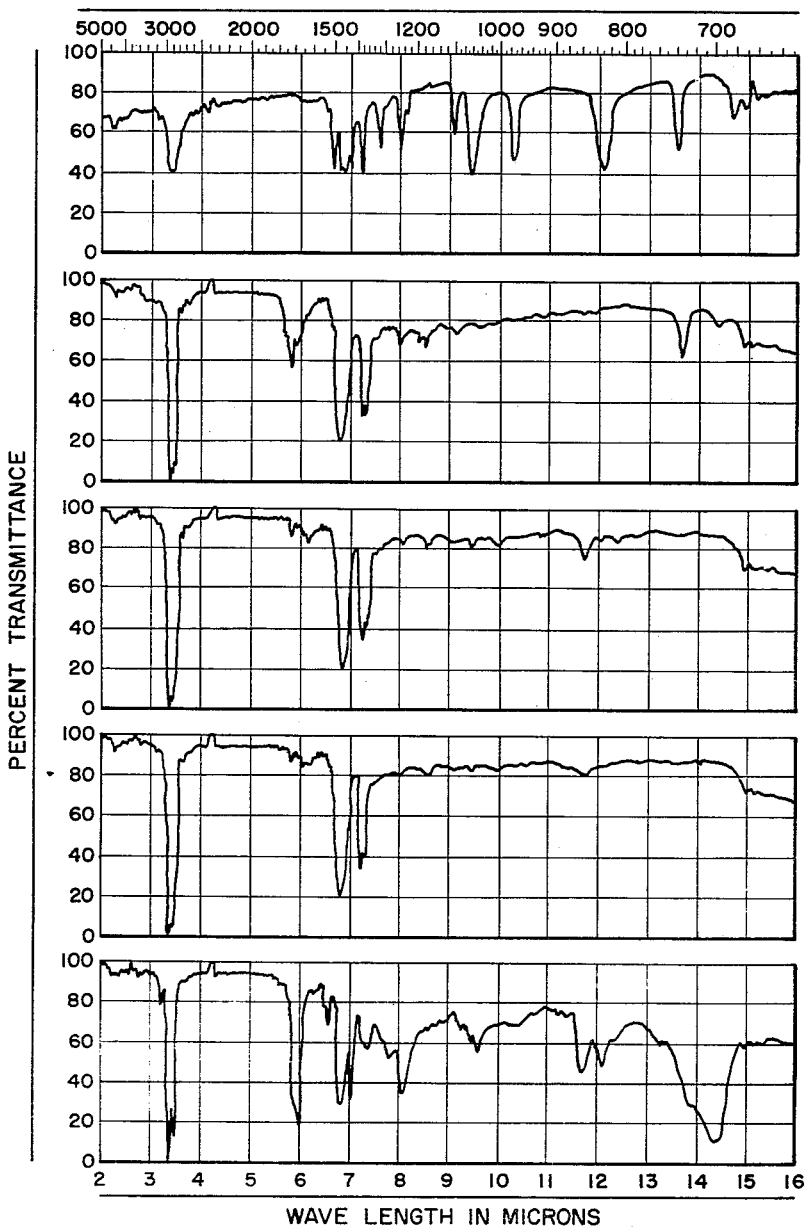

United States Patent Office 3,149,177
Patented Sept. 15, 1964

3,149,177
MANUFACTURE OF POLYALKYLBENZENES
Alexander Shadan, Ponca City, Okla., assignor to Continental Oil Company, Ponca City, Okla., a corporation of Delaware
Filed Jan. 23, 1961, Ser. No. 83,983
6 Claims. (Cl. 260—673)

This invention relates to a novel method of manufacture of polyalkylbenzenes. More particularly, it is concerned with a method which does not require benzene as a raw material.

Polycarboxylic acids having a cyclic nucleus, such as a benzene ring, have been found to be very useful as curing agents for epoxy resins. Acids of this type may conveniently be made by oxidation of various polyalkyl substituted cyclic hydrocarbons. Among the curing agents which are being used at the present time are trimellitic acid, pyromellitic acid, and pyromellitic dianhydride which are made from the corresponding polymethyl benzenes. Tricarboxy carboxymethyl cyclopentanes are among newer epoxy resin curing agents. For efficient and economical manufacture of polyalkyl substituted raw materials for conversion to polycarboxylic acids certain problems must be overcome. In most instances polyalkylbenzenes are prepared by alkylation of benzene with alkyl halides or olefins in the presence of Friedel-Crafts catalysts. In the case of hexaalkylbenzenes, rather difficult and drastic exhaustive alkylation procedures may be required. Furthermore, it is often necessary to purchase benzene in a market in which the price fluctuates in response to the fluctuations in the steel making and by-product coking businesses. If the manufacture of polyalkylbenzenes were based entirely on low-molecular-weight aliphatic hydrocarbons, lower and more stable manufacturing costs could be achieved.

It is the principal object of this invention to base the manufacture of hexaethylbenzene on ethylene as the basic raw material.

It is a further object of this invention to manufacture hexaethylbenzene by means of a novel reaction of ethylene and ethyl bromide. Other objects and advantages will become apparent on reading the following description of the invention.

Ethylene may be reacted in the presence of ethyl chloride and aluminum chloride catalyst to yield polymeric substances of varying molecular weights. (See, for example, U.S. Patent No. 2,603,665). This appears to be characteristic behavior of ethylene and ethyl halides in the presence of Friedel-Crafts catalysts. I have discovered, however, that ethylene may be made to react with a solution prepared by dissolving in ethyl bromide an aluminum halide, such as aluminum chloride or bromide, to give good yields of hexaethylbenzene. No theory is offered to explain this reaction, since no satisfactory explanation is available. The addition of aluminum chloride to ethyl bromide is reported to yield a liquid adduct of the formula $Al_2Cl_6 \cdot C_8H_{16}$. It seems probable that in the course of the reaction this adduct becomes converted to the corresponding adduct with hexaethylbenzene $$Al_2Cl_6 \cdot C_6(C_2H_5)_6$$

or $Al_2Br_6 \cdot C_6(C_2H_5)_6$, although just how this occurs is difficult to visualize. However, it is relatively easy to perform the simple procedure of Example 1 and make independent observations of the results, so that speculation concerning theoretical aspects is unnecessary.

In reference to the drawings, FIGURE 1 is a diagram of process flow of a plant for manufacture of hexaethylbenzene. FIGURE 2 is an infrared transmittance curve for hexaethylbenzene, and FIGURES 3 to 6, inclusive, are infrared curves for by-products obtained in the process.

The method of this invention is adaptable to both continuous and batch operation, and may be based entirely on ethylene as raw material, since ethyl bromide may be made from ethylene by known means and the bromine may be recovered from the by-products of the reaction. The following examples are presented for purposes of illustration, it being clearly understood that the invention is not to be considered as limited to the specific conditions set forth therein.

*Example 1*

Ethyl bromide (2,000 ml.) was placed in a flask provided with stirrer, thermometer, reflux condenser, and inlet for gas. Aluminum chloride (5–7 percent by weight of ethyl bromide) was added, and the flask was cooled in ice water to about 2–3° C. Then ethylene gas was passed in for 2½ to 3 hours. The temperature of the reaction mixture was kept at 10–12° C. by regulating the flow of gas. When the temperature started to drop steadily, the gas was shut off.

The reaction mixture was poured on ice (2 kg.). The bottom layer, consisting of ethyl bromide with product dissolved therein, was separated and washed successively with dilute hydrochloric acid, 5 percent aqueous sodium carbonate solution, then with water, and dried over anhydrous calcium chloride. The ethyl bromide was removed by distillation to give 149 grams of product. On standing and cooling, a solid substance separated, which was filtered off and purified by recrystallization, yielding 16.8 grams of crystalline material, m. 130° C. (not corr.).

*Analysis.*—Calculated: C, 87.8%; H, 12.2%. Observed: C, 87.6%; H, 11.9%. Molecular weight: Calculated for $C_6(C_2H_5)_6$, 246. Observed: 240.

The infrared spectrum of this crystalline product was identical to that of a pure sample of hexaethylbenzene, and is illustrated in FIGURE 2. The specimen for infrared examination was prepared by grinding intimately with potassium bromide and pressing the powder mixture into a thin sheet.

The above example serves to illustrate the manner in which this unusual reaction may be carried out in a laboratory by a technician possessing ordinary skill. The use of ethyl bromide as solvent diluent is most convenient, since the low boiling point of this substance facilitates both temperature control by refluxing and recovery of the diluent for re-use. Inert paraffinic hydrocarbon solvents may be used, however, if desired. Through control of the temperature by cooling in the first washing and separation step, as shown in this example, no excessive pressures occur. Since the method does not require use of either high pressures or high temperatures, simple inexpensive process equipment may be used. The process may be operated in a closed system under elevated temperatures and pressures, but without substantial advantages, with the exception of increase of throughput rate. Equipment may be protected from the corrosive effects of aluminum chloride and dilute acid by suitable corrosion resistant linings.

In the following example there is illlustrated the manufacture of hexaethylbenzene in a batch process. Parts given are parts by weight unless stated otherwise.

*Example 2*

To 10,000 parts of ethyl bromide were added, with cooling, 750 parts of aluminum chloride. Ethylene gas was reacted with stirring and cooling by refluxing of ethyl bromide for approximately four hours, until reaction appeared complete, as indicated by declining reaction temperature. The reaction mixture was poured slowly into a mixture of 5,000 parts of ice and 1,000 parts of concentrated hydrochloric acid. The organic layer was separated and washed first with approximately 500 parts of 5 percent sodium carbonate solution, then with approximately 500 parts of water. The ethyl bromide and water were removed from the product by distillation, leaving 725 parts of product mixture from which 75 parts of crystalline hexaethylbenzene were recovered on chilling, followed by filtration.

The oily liquid filtrate was separated by fractional distillation to give products boiling from 60° to 160° C. at 1 mm. pressure, plus a residue having a very low vapor pressure. The first fraction, obtained at 60° C. gave the infrared curve of FIGURE 3. The second fraction, obtained at 110° C., gave the infrared curve of FIGURE 4. The third fraction, obtained at 160° C. gave the infrared curve of FIGURE 5. The distillation residue gave the infrared curve of FIGURE 6. These curves serve to point out the distinct differences which exist between hexaethylbenzene and the various by-products. The by-products are primarily hydrocarbon in nature, containing in some instances, very low percentages of bromine. The residue, in particular, may be utilized to produce mixtures of polycarboxylic acids by oxidation.

*Example 3*

The operation of the method of this invention on a commercial scale may be better understood by reference to FIGURE 1 and the description which follows:

Ethyl bromide and aluminum chloride or aluminum bromide are introduced into the stirred reactor 1. Ethylene is admitted under sufficient pressure to maintain good contact with the ethyl bromide and the temperature is maintained not substantially above the boiling point of the solution, preferably at or below the boiling point of the liquid mixture by cooling (below about 40° C.). Subsequently, the reaction mixture is treated with dilute hydrochloric acid to remove aluminum halide, the heat of hydration being conveniently absorbed by addition of ice, and the mixture is separated into two liquid phases in chiller and separator 2. The aqueous phase may be treated to recover bromine with a alumina. The heavier organic phase is washed with a dilute alkaline solution such as aqueous sodium carbonate in neutralizing wash tower 3, then is washed with water in wash tower 4. In distillation tower 5 the ethyl bromide is recovered for recycling, water is driven off, and the liquid distillation residue is then cooled and the crystalline product precipitated in crystallizer 6. As shown in the diagram, the crystalline product may then be washed and filtered in a conveyor centrifuge 7. Alternatively, a rotating drum filler may be used with the wash liquid being sprayed on the filter cake while still on the drum. Cold 95 percent ethanol has been found to be suitable as a wash liquid. The liquid by-products removed by line 8 may be worked up by fractional distillation. These products include polymeric substances of various molecular weights containing olefinic unsaturation and as much as 0.2 percent bromine in some instances, as well as polyalkylbenzenes.

The hexaethylbenzene obtained by the method described herein is a white crystalline substance of high purity, suitable for conversion to polycarboxylic acids and other products. It will be understood that the method may be readily modified to produce a product of lower purity, and other variations and modifications within the scope of the appended claims will naturally occur to those who are skilled in the art.

I claim:

1. The method of manufacture of hexaethylbenzene comprising reaction of ethylene with ethyl bromide and an aluminum halide and recovery of polyalkylbenzene from the reaction mixture so produced.

2. The method of manufacture of hexaethylbenzene comprising reaction of ethylene with a solution prepared by dissolving in ethylbromide an aluminum halide selected from the group consisting of aluminum chloride and aluminum bromide and recovery of hexaethylbenzene from the reaction mixture so produced.

3. The method of manufacture of hexaethylbenzene comprising combining aluminum chloride with sufficient ethyl bromide to produce a homogeneous solution, reaction of ethylene therewith at atmospheric pressure and at a temperature not substantially above the boiling point of the solution and recovery of hexaethylbenzene from the reaction mixture so produced.

4. The method of manufacture of hexaethylbenzene comprising combining aluminum bromide with sufficient ethyl bromide to produce a homogeneous solution, reaction of ethylene therewith at atmospheric pressure and at a temperature not substantially above the boiling point of the solution and recovery of hexaethylbenzene from the reaction mixture so produced.

5. The method of manufacture of hexaethylbenzene comprising reaction of ethylene with ethyl bromide and aluminum chloride in ethyl bromide as diluent, controlling the temperature of the reaction mixture by refluxing the diluent, treatment of the resulting reaction product mixture with an aqueous reagent to effect the removal of aluminum chloride therefrom, removal of diluent by distillation and recovery of hexaethylbenzene from the resulting product.

6. The method of manufacture of hexaethylbenzene comprising the reaction of ethylene with a solution prepared by dissolving in ethyl bromide an aluminum halide selected from the group consisting of aluminum chloride and aluminum bromide in the presence of a diluent selected from the group consisting of ethyl bromide and inert paraffinic hydrocarbon solvents at a temperature below about 40° C. and recovery of hexaethylbenzene from the resulting reaction product mixture.

References Cited in the file of this patent

UNITED STATES PATENTS

| | | |
|---|---|---|
| 2,230,461 | Kormarewsky | Feb. 4, 1941 |
| 2,458,977 | Carmody | Jan. 11, 1949 |
| 2,882,325 | Luvisi et al. | Apr. 14, 1959 |